(12) United States Patent
Kleider et al.

(10) Patent No.: US 11,444,670 B1
(45) Date of Patent: Sep. 13, 2022

(54) METHOD AND APPARATUS FOR DISTRIBUTED BEAMFORMING

(71) Applicant: General Dynamics Mission Systems, Inc., Fairfax, VA (US)

(72) Inventors: John Kleider, Fairfax, VA (US); Christopher Steenhoek, Fairfax, VA (US)

(73) Assignee: General Dynamics Mission Systems, Inc.

( * ) Notice: Subject to any disclaimer, the term of this patent is extended or adjusted under 35 U.S.C. 154(b) by 0 days.

(21) Appl. No.: 17/451,145

(22) Filed: Oct. 15, 2021

(51) Int. Cl.
*H04B 7/06* (2006.01)
*H04W 56/00* (2009.01)
*H04L 27/26* (2006.01)

(52) U.S. Cl.
CPC ......... *H04B 7/0617* (2013.01); *H04B 7/0639* (2013.01); *H04L 27/2675* (2013.01); *H04W 56/0045* (2013.01)

(58) Field of Classification Search
CPC . H04B 7/0617; H04B 7/0639; H04L 27/2675; H04W 56/0045
USPC ........................................................ 375/267
See application file for complete search history.

(56) References Cited

U.S. PATENT DOCUMENTS

| | | | |
|---|---|---|---|
| 2016/0118716 A1* | 4/2016 | Stephenne | H04B 7/0695 342/372 |
| 2021/0083813 A1* | 3/2021 | Wu | H04W 36/18 |

\* cited by examiner

*Primary Examiner* — Fitwi Y Hailegiorgis
(74) *Attorney, Agent, or Firm* — LKGlobal | Lorenz & Kopf, LLP (57) ABSTRACT

Transmitting a data signal by generating a first symbol in response to the data signal and a first synchronization sequence and a second symbol in response to the data signal and a second synchronization sequence, applying a distributed coding matrix to the first symbol and the second symbol to generate a first transmission signal and a second transmission signal, transmitting the first transmission signal and the second transmission signal to the far field, isolating the first transmission signal by applying the first synchronization sequence to the far field, isolating the second transmission signal by applying the second synchronization sequence to the far field, applying the distributed coding matrix to the first transmission signal to extract the first symbol, applying the distributed coding matrix to the second transmission signal to extract the second symbol and estimating the data signal in response to the first symbol and the second symbol.

20 Claims, 10 Drawing Sheets

METHOD AND APPARATUS FOR DISTRIBUTED BEAMFORMING

TECHNICAL FIELD

The technical field relates generally to electromagnetic transmitter and receivers, and more particularly relates to methods and apparatus for providing an open-loop and closed-loop distributed beamforming transmitter and receiver using joint synchronization-pilot sequences and a single step feedback approach to achieve improved signal to noise ratio performance.

BACKGROUND

Distributed beamforming (DBF) schemes are receiving increased interest for military and commercial applications due to radio frequency spectral congestion, the possibility of system implementation in autonomous systems, reduced interference requirements to existing legacy systems and/or other co-site signals, and the desire for improvements in low probability of intercept (LPI) and low probability of detection (LPD) transmissions.

One of the most challenging aspects of DBF schemes is to provide phase coherence between the collaborating transmit nodes and the collaborating receiver nodes as each transmitter and receiver has independent timing, phase, frequency offset and geometric position variation. For DBF to be effective, these transmitted signals must be carefully coordinated such that constructive combination of the transmitted signals at each receiver is achieved. DBF systems may be generally classified as open-loop systems, where no feedback is provided between the transmitters and receivers, and closed-loop systems, where a feedback path is provided. Closed-loop systems may include one bit feedback methods or multi-bit feedback methods. These closed-loop methods may require multiple cycles to reach convergence. For example, one-bit feedback methods may perform poorly in mobile channels due to deterministic signal perturbations and therefore may require hundreds of time slots to converge. As such, it is desirable to address these problems and provide a robust solution for distributed beamforming. In addition, other desirable features and characteristics will become apparent from the subsequent summary and detailed description, and the appended claims, taken in conjunction with the accompanying drawings and this background.

SUMMARY

Disclosed herein are communications systems, communication algorithms, sensors, transmitter and receiver arrays and related control logic for provisioning communications systems, methods for making and methods for operating such systems, and other systems equipped with such transmitters, receivers, and transceivers in a DBF configuration. By way of example, and not limitation, there is presented method and apparatus for providing an open-loop or closed-loop digital beamforming scheme employing joint synchronization-channel estimation (JSCE) signals combined with distributed coding which requires only a linear increase in receiver complexity as the number of collaborating DBF nodes increases.

In a first non-limiting embodiment, a beamforming communications system including a first transmitter configured for generating a first symbol in response to the data signal and a first synchronization sequence and for generating a first transmission signal by applying a distributed coding matrix to the first symbol, a second transmitter configured for generating a second symbol in response to the data signal and a second synchronization sequence and for generating a second transmission signal by applying the distributed coding matrix to the second symbol, a first receiver configured for receiving the first transmission signal and the second transmission signal, for isolating the first transmission signal in response to the first synchronization sequence, and for extracting the first symbol from the first transmission signal in response to applying the distributed coding matrix to the first transmission signal, a second receiver configured for receiving the first transmission signal and the second transmission signal, isolating the second transmission signal in response to the second synchronization sequence and extracting the second symbol in response to applying the distributed coding matrix to the first transmission signal, and a processor configured for estimating the data signal in response to the first symbol and the second symbol.

In some exemplary embodiments, a symbol may be described as a pulse in digital baseband transmission or a tone in passband transmission using modems. A symbol may be a waveform, a state or a significant condition of the communication channel that persists, for a fixed period of time. The distributed coding may be applied to symbols or to digital samples. A symbol can be comprised of a single digital sample per symbol or multiple digital samples per symbol. In this case digital samples are typically baseband digital samples.

In accordance with another aspect of the present disclosure, a method for transmitting a data signal employing a digital beamforming technique including generating, by a first transmitter, a first symbol in response to the data signal and a first synchronization sequence, generating, by the first transmitter, a first transmission signal by applying a distributed coding matrix to the first symbol, generating, by a second transmitter, a second symbol in response to the data signal and a second synchronization sequence, generating, by the second transmitter, a second transmission signal by applying the distributed coding matrix to the second symbol, receiving, by a first receiver, the first transmission signal and the second transmission signal, isolating, by the first receiver, the first transmission signal in response to the first synchronization sequence, extracting, by the first receiver, the first symbol from the first transmission signal in response to applying the distributed coding matrix to the first transmission signal, receiving, by a second receiver, the first transmission signal and the second transmission signal, isolating, by the second receiver, the first transmission signal in response to the second synchronization sequence, extracting, by the second receiver, the second symbol in response to applying the distributed coding matrix to the first transmission signal, and estimating, by a processor, the data signal in response to the first symbol and the second symbol.

In accordance with another aspect of the present disclosure, a method of transmitting a data signal including receiving a data signal, generating a first symbol in response to the data signal and a first synchronization sequence, generating a second symbol in response to the data signal and a second synchronization sequence, generating a first transmission signal in response to applying a distributed coding matrix to the first symbol, generating a second transmission signal in response to applying the distributed coding matrix to the second symbol, transmitting the first transmission signal by a first transmitter, transmitting the second transmission signal by a second transmitter, receiving the first transmission signal and the second transmission signal, isolating the first transmission signal in response to the first synchronization sequence, isolating the second transmission signal in response to the second synchronization sequence, extracting the first symbol by applying the distributed coding matrix to the first transmission signal, extracting the second symbol by applying the distributed coding matrix to the second transmission signal, and estimating the data signal in response to the first symbol and the second symbol.

Other objects, advantages and novel features of the exemplary embodiments will become more apparent from the following detailed description of exemplary embodiments and the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Various non-limiting embodiments of communications systems, communication system algorithms, and software are provided. In general, the disclosure herein describes a communications system employing distributed beamforming (DBF) via joint synchronization-channel estimation (JSCE) combined with scalable distributed coding. The DBF communications system provides improved signal-to-noise ratio (SNR) that affords, but is not limited to, range extension, lower transmit power, higher throughput, LPI/LPD signaling, interference mitigation, and spatial selectivity.

Figure 1:
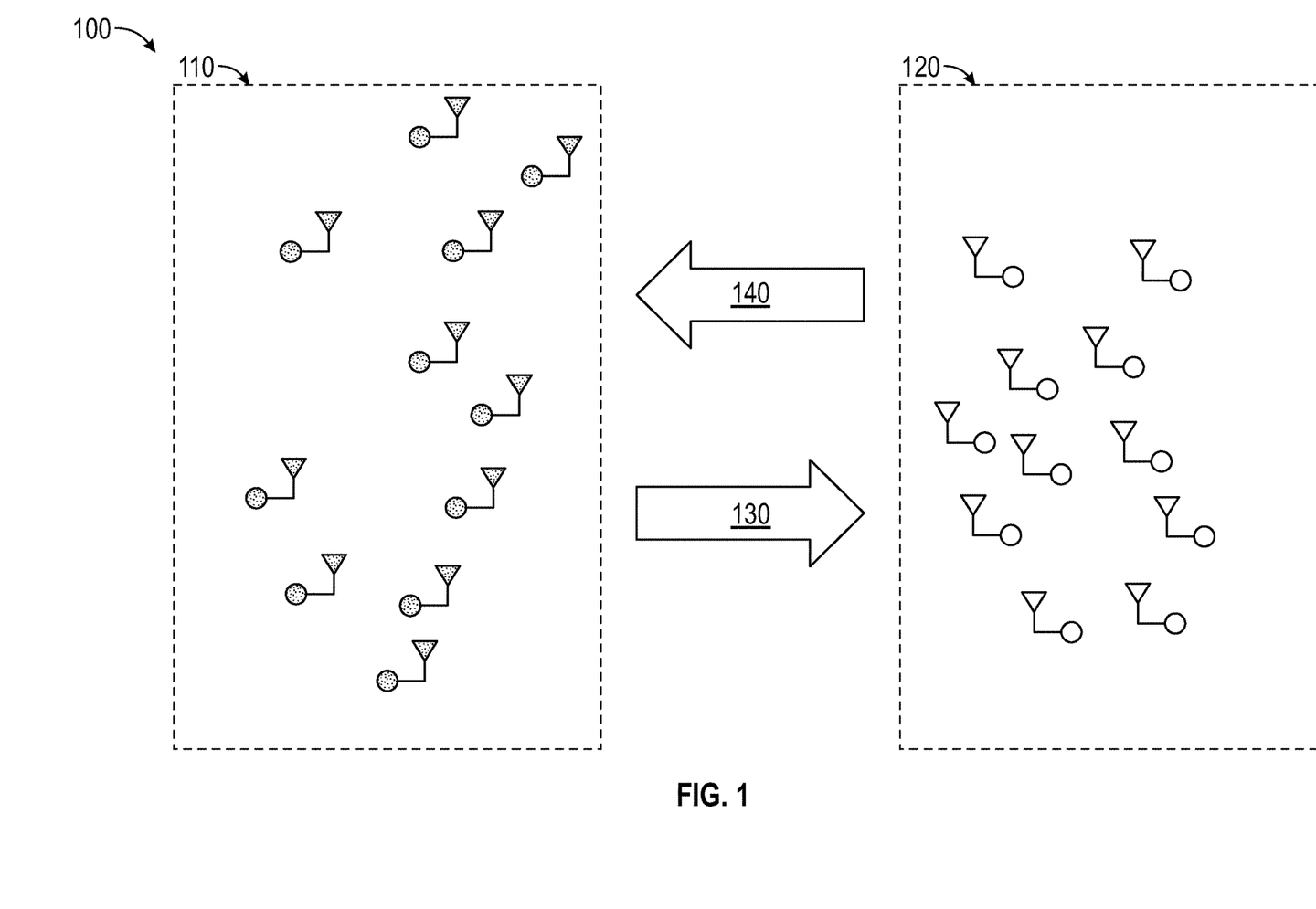
FIG. 1 illustrates a system for implementing a scalable DBF communications according to an exemplary embodiment of the present disclosure.

Turning now to FIG. 1, an environment 100 for a system for implementing a scalable DBF communications system according to an exemplary embodiment of the present disclosure is shown.

In some exemplary DBF communications systems each of a plurality of transmitters 110 may cooperate as a virtual transmit antenna array to form a beam (signal) 130 toward a plurality of receivers 120. Each of the plurality of transmitters 110 may be an omni-directional transmitter or employ an antenna with some gain directed in the general direction of the plurality of receivers 120. Similarly, a plurality of receivers 120 may cooperate as a virtual receive antenna array to form a beam (signal) 140 toward a plurality of transmitters 110. Each of the plurality of receivers 120 may be an omni-directional receiver or employ an antenna with some gain directed in the general direction of the plurality of transmitters 110. Being independent radios, each of the plurality of transmitters 110 and each of the plurality of receivers 120 may experience independent timing, frequency, and phase offsets in their on-board oscillators. Furthermore, the distributed antenna elements of the virtual transmit antenna array and the distributed antenna elements of the virtual receive antenna array may also experience non-ideal alignment, especially if node elements are mobile, even when precise formation controllers are utilized. Note that the exemplary DBF communications system is general in that it can also apply to a distributed array of sub-arrays where each of the antennas of the transmitters or the receivers or both the transmitters and receivers are an array of antenna elements.

The DBF communications system employs methods which enable each of the plurality of receivers 120 to separate the individual transmit signals of each of the plurality of transmitters 110. Each of the plurality of receivers 120 may then, using transmitted synchronization signals, estimate and correct timing, frequency, and phase offsets of each transmitted signal and coherently sum the corrected transmit signals to reproduce the transmit beam 130 despite the independent offsets and non-ideal alignment of the virtual transmit array. This provides an N times gain in SNR where N is the number of transmitters cooperating as a virtual antenna array. Subsequently, the received beams at each cooperating receiver of the plurality of receivers 120 may be provided to a central DBF receiver where the received beams may be phase aligned and coherently summed to provide an N*M gain in SNR, where M is the number of receivers cooperating as a virtual antenna array.

In a closed-loop DBF system, a feedback channel may be employed such that the timing, frequency, and magnitude and phase correction estimates determined by each of the plurality of receivers 120 for each of the plurality of transmitters 110 may be sent back to the respective transmitters. When a plurality of receivers 120 are collaborating, each receiver will produce timing, frequency, and magnitude and phase correction estimates for each of the collaborating transmitters 110. These correction estimates may be averaged by a central DBF receiver to provide improved feedback to the transmitters. Upon receiving correction estimates, the respective transmitter may then adjust the transmitted signal in order to maximize the SNR experienced by the receivers. The DBF system may achieve a closed-loop SNR gain of $N^2*M$. When no feedback channel is employed, the system is considered open-loop and achieves the N*M gain in SNR.

A DBF communications system may operate with a single receiver and a plurality of cooperating transmitters. In this DBF system the transmitters may cooperate as a virtual antenna array to form a beam toward a single receiver. The single receiver may then estimate and correct the timing, frequency, magnitude differences and phase offsets of each transmitted signal and coherently sum the corrected transmit signals to reproduce the transmit beam to produce an N times gain in SNR at the receiver in open-loop. If a feedback channel is employed the receiver may send back the correction estimates to the respective transmitters. Upon receiving correction estimates, the respective transmitter may then adjust the transmitted signal in order to maximize the SNR experienced by the receiver. The single receiver DBF system may achieve a closed-loop SNR gain of $N^2$.

A DBF communications system may operate with a single transmitter and a plurality of cooperating receivers. In this DBF system the receivers may cooperate as a virtual antenna array to form a beam toward a single transmitter. The plurality of receivers will receive the single transmit signal, estimate and corrects the timing, frequency, magnitude differences and phase offsets. Subsequently, the received signal at each cooperating receiver may be provided to a central DBF receiver where they may be magnitude and phase aligned and coherently summed to provide an open-loop SNR gain of M, where M is the number of receivers cooperating as a virtual antenna array A closed-loop DBF communication system may feed back correction estimates to the transmit virtual antenna array to achieve maximum theoretical beamforming gain in a single step which supports higher mobility than multi-step feedback systems. Multi-step feedback systems, which can take up to 100's or 1000's of feedback steps before SNR-gain is maximized, may suffer from beamforming gain degradation due continuous geometric variation experienced by an array of mobile nodes. When feedback is utilized to maximize the received SNR, the channel is constantly changing and the feedback corrections may become stale and erroneous due to both receiver estimation error and channel decorrelation between DBF-Rx correction weight estimation output time and the time at which the corrections are applied to the DBF-Tx system. Single step feedback enables lower latency between correction updates and, therefore, minimizes error in the beamforming correction weights. With single-step feedback, the DBF system may be tuned to the mobility of the system with higher or lower rates of feedback.

Figure 2:
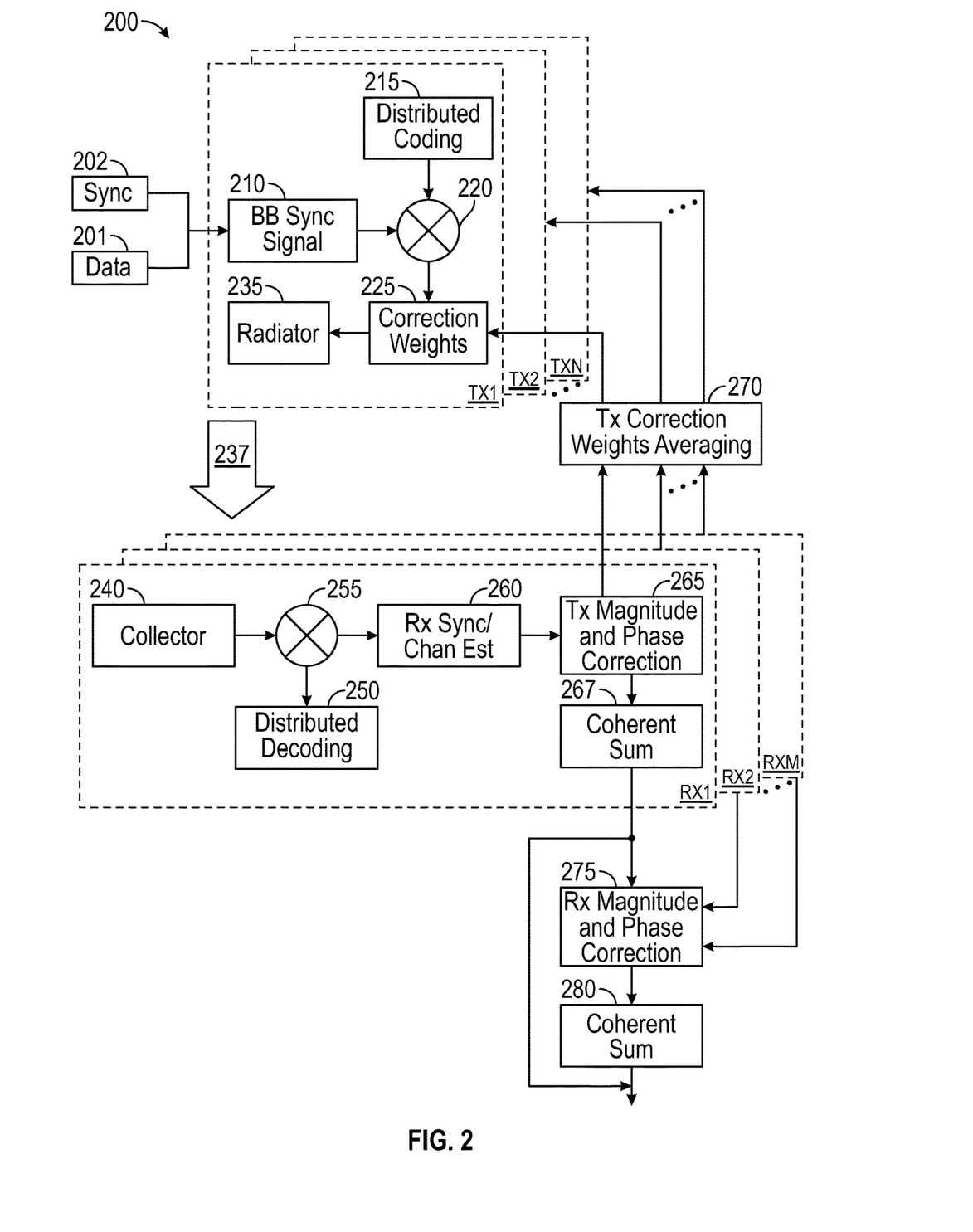
FIG. 2 is a simplified functional block diagram illustrating a non-limiting embodiment of a system for implementing a DBF communications system in accordance with the teachings of the present disclosure.

Turning now to FIG. 2 a simplified functional block diagram illustrating a non-limiting embodiment of a system 200 for implementing a DBF communications system is shown. In this exemplary system 200, there are N different elements collaborating in the DBF-Tx system TX1, TX2 . . . TXn, while M different elements collaborate in the DBF-Rx System RX1, RX2 . . . RXm. The exemplary system 200 employs a synchronization-channel estimation sequence 202 applied at each of the N transmitters TX1, TX2 . . . TXn. The synchronization-channel estimation sequence should be one such that timing-, frequency-, and phase-offsets can be determined for each individual transmitter signal. Furthermore the synchronization-channel estimation signal may also include signal parts that enable magnitude and phase channel differences between each individual transmitter element and each individual receiver antenna element, such that these differences can be estimated and corrected. This synchronization-channel sequence 202 is utilized by each of the M receivers to enable estimation and removal of any synchronization or channel differences. The system further uses scalable distributed coding applied in space and time across each of the N transmitters TX1, TX2 . . . TXn to enable each transmit signal to be decomposed independently at each of the M receivers RX1, RX2 . . . RXm for equal SNR detection. The exemplary system 200 is scalable up to hundreds of nodes due to the minimal mutual interference experienced at each of the M receivers RX1, RX2 . . . RXm. When the SNR gain, as measured by the receiver, is more than N*M, the receiver may direct the transmitter to turn off the distributed coding on the data and/or sync-channel estimation portions of the signal. If distributed coding is still used, in conjunction with the correction weights sent by the receiver during closed-loop operation, the SNR gain is limited to N*M. It is only when the distributed coding is turned off (by the distributed coding selector), that the system is able to achieve $N^2*M$ SNR gain. Because there is typically sufficient additional processing gain in the synchronization-channel estimation signal and because we want to process these signals separately at the receiver, in most cases we want to still apply the distributed coding to each transmitter during the synchronization-channel estimation signaling interval. In some embodiments, channel estimation may be performed by inserting cell-specific reference signals, such as pilot symbols, at assigned positions in both time and frequency. These pilot symbols may be used to provide a reliable estimate of the complex gains of the propagation channel in order to improve the communications system performance in terms of bit error rate and thereby increasing the capacity of the communications system, such as an OFDMA system.

A first of the exemplary transmitters TX1 is configured to generate baseband synchronization signals 210 in response to the synchronization sequence 202 and a data signal 201. The baseband synchronization signal 210 may be encoded using CDMA channel access method or any multiple access method. In some exemplary embodiments, the synchronization signal 210 may be a sync word, sync character, sync sequence or sync preamble used to synchronize a data transmission by indicating the end of header information and the start of the data signal 201. This synchronization signal 210 may be used to time-align a received signal with local references, such as a data clock and/or demodulator waveforms. The baseband synchronization signal 210 is then mixed with a mixer 220 with the unitary distributed coding matrix 215 to generate the distributed coded signals. In some embodiments, the mixer 220 may perform a matrix operation, such as matrix multiplication. This matrix operation may be performed in the digital domain. One characteristic of the distributed coding is that the coding is applied over N symbol transmissions. Statistically, it is desired that the output of the coding technique produces an average power over N symbol transmissions that is the same regardless of random carrier phase of the individual DBF transmit elements and their coherent sum in the far-field of the radiated signal. By employing this strategy, all decoupled signals at the output of the decoding process at each receiver element will experience approximately the same SNR improvement. As the average power over the N symbol transmissions diverge or have dissimilar powers, the system may experience un-even SNR distributions at the receiver detection and estimation process.

In the exemplary unitary distributed coding matrix 215, all rows and columns may have a structured amplitude and/or phase adjustment term, therefore, all spatial and time-based symbols (and/or samples), even if transmitter phases are random, can be decoupled at a receiver with equal SNR. All rows and columns have the same average power which is a key statistical characteristic to ensure all distributed transmitters have equivalent detection SNR at a receiver. The unitary distributed coding matrix 215 may then be scalable for the number distributed transmitters (N). The decoupling of each transmitter signal is made possible by the inverse of unitary distributed coding matrix which for this case is the unitary distributed coding matrix 215. Thus only the number of distributed transmitters are needed to decouple each transmitter's signal and is a simple matrix multiply operation.

The distributed coding used by the exemplary system may be applied over N symbol transmissions such that the output of the coding technique produces an average power over N symbol transmissions that is the same regardless of random carrier phase of the individual DBF transmit elements and their coherent sum in the far-field of the radiated signal. By employing the distributed coding strategy all decoupled signals at the output of the decoding process at each receiver element will experience approximately the same SNR improvement. If the average power statistic characteristic is not met, as mentioned, the receiver estimation process will fail to produce statistically equivalent SNR estimation and detection performance. The unitary distributed coding process ensures the average power statistic characteristic. The distributed coding may also be applied over a constant times the N samples or symbols of the N transmitter signals.

Even if each transmitter TX1, TX2 . . . TXn is equipped with GPS-discipline oscillators, each transmit node will still experience synchronization offsets relative to one another. In a completely wireless DBF, common timing and oscillator references are not available between the individual nodes. Furthermore, the distributed antenna elements will also experience non-ideal alignment, especially when each node element is mobile, even when precise formation controllers are utilized. If a feedback channel is available, magnitude and/or phase error correction weights 225 computed at the DBF receiver are relayed back to the DBF transmitter. The magnitude and/or phase error correction weights 225 may include any residual synchronization corrections and channel corrections necessary to ensure coherency of the transmit signals to create a coherent beam. The magnitude and/or phase error correction weights 255 may also be used to maximize the global SNR across all DBF receiver elements. For closed-loop operation, the correction weights 225 may be fed back in a single-step, which enables the system to operate in mobile channels. For close-loop operation, the SNR is maximized by coherently aligning the individual DBF transmit signals in the far-field radiated signal. The maximum SNR gain for the closed-loop DBF transmit and DBF receive system is equal to $N^2M$ with 1-step feedback. If no feedback channel is available, the DBF receive input SNR cannot be maximized and the maximum gain is limited to NM. The distributed signal with magnitude and/or phase error correction weights applied are coupled to the radiator 235. The distributed signal may then be modulated with appropriate radio frequency carrier signals and the desired carrier frequencies and then transmitted to the receivers as a transmitted signal 237. In some exemplary embodiments, correction weights may be magnitude and phase-dependent correction weights per transmitter, which may be frequency dependent for frequency-selective channels and time-dependent for time-selective channels and a combination thereof. The synchronization correction weights may be used to adjust coarse and fine timing-, sampling, frequency- and/or phase-offsets.

On the receiver side, the transmitted signal 237 is received at the collector 240. Channel noise and/or time-selective and/or frequency-selective fading may be present in the received signal in addition to the transmitted signal 237. Channel fading could be due to time-, frequency- and/or spatial-variations in the channel over the signal transmission intervals. The collector 240 may include an antenna as well as circuitry to amplify, filter and demodulate the transmitted signal 237 to recover the coded distributed signal. The coded distributed signal is next combined with the distributed coding matrix 250 for each of the plurality of receivers, RX1, Rx2 . . . RXn. The distributed coding matrix 250 may be a unitary matrix and may allow for consistent SNR detection over each transmitted signal in order to maximize synchronization, estimation, and correction performance. Advantageously the unitary coding matrix provides for consistent average power output for each transmitter to avoid varying SNR detections coming into the receivers.

In one exemplary embodiment, timing and frequency synchronization and channel estimation may be performed on each of the transmit signals by the received signal sync and channel estimation block 260 and the resulting signals are magnitude corrected and phase aligned by the Tx magnitude and/or phase correction offsets 265 to enable a coherent sum 267. The Tx magnitude and/or phase correction offsets 265 may be determined for the received signal by the received signal sync and channel estimation block 260 and coupled, with Tx magnitude and/or phase correction offsets from other receivers (RX2 . . . RXn) to a generate a magnitude and/or phase correction weight average 270 which is transmitted back to the transmitters TX1. In some embodiments, the Tx frequency and timing offsets determined by the received signal sync and channel estimation block 260 and the magnitude and phase corrections 265 may be coupled with the same corrections from the other receivers. The correction weights sent from the DBF central receiver to the DBF transmitters may also include sampling offset, frequency offset and/or clock offset corrections for each distributed transmitter. In some exemplary embodiments, error terms are acquired, estimated and averaged at the receiver. This involves a bank of synchronizers and maximum likelihood estimators, such as a bank of correlators, the number of which for each receiver is equal to the number of transmitters, N. The DBF central receiver may then be configured to use M-maximum likelihood estimators to combine each of the receiver estimates to further improve the estimate by a factor of M. Additionally, the receiver may direct one or more transmitters to turn off distributed coding to the data stream if sufficient coherent gains are realized. For example, a weight vector could be a set of simple complex weights, the size of which is the number of antennas and/or RF chains or simple a vector of all 1's applied to the data and/or the synchronization channel estimation signal.

Finally, the receivers are configured to magnitude correct and phase align each of the received signals from each of the plurality of receivers RX1, RX2 . . . RXn in response to magnitude and/or phase correction weights to compensate for receiver magnitude, phase, frequency and timing offsets. These corrected received signals are then coherently summed 280 to extract the transmitted baseband signal.

Figure 3:
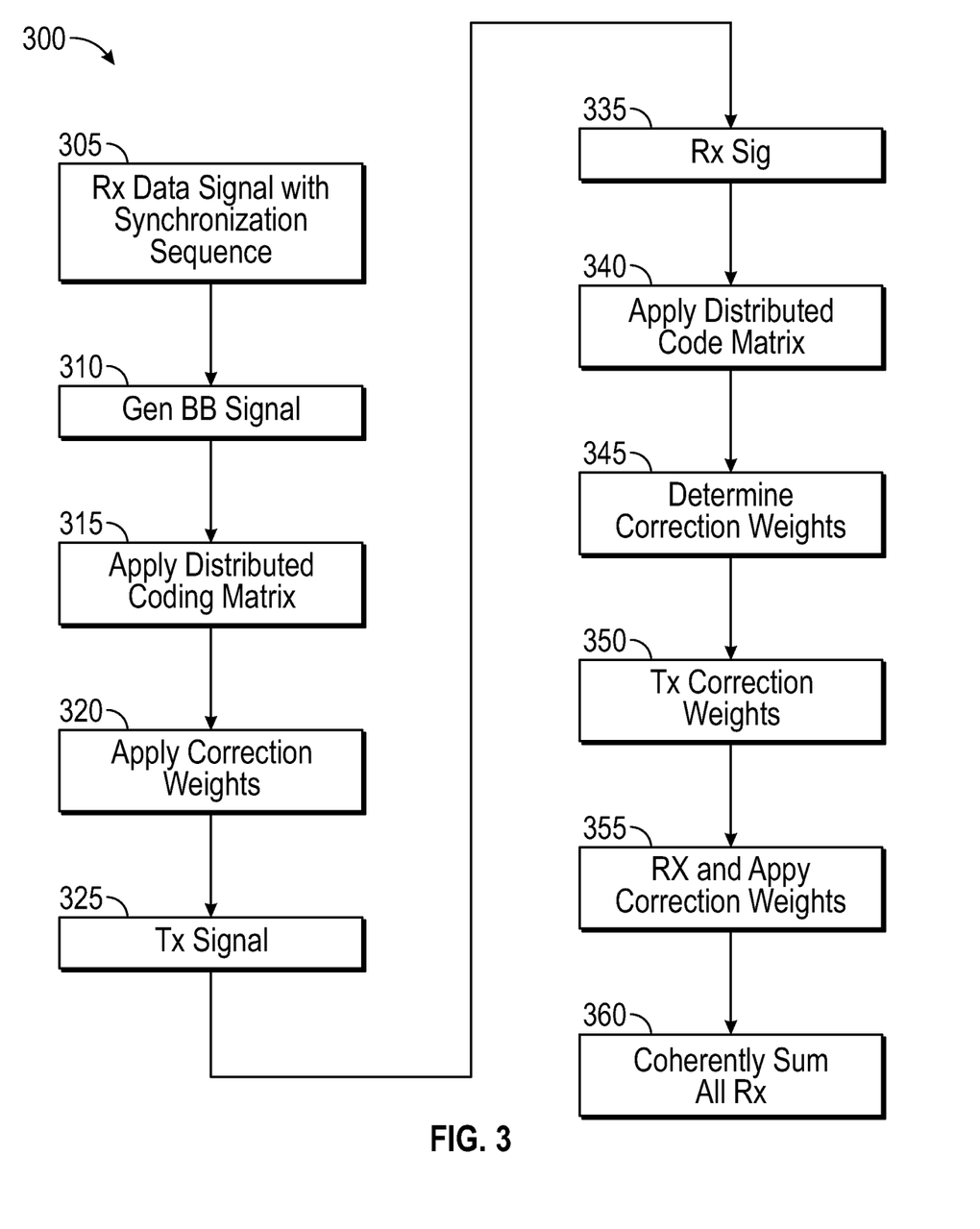
FIG. 3 is a flow diagram illustrating a non-limiting embodiment of a method for implementing a DBF communications system in accordance with the present disclosure.

Turning now to FIG. 3, a flow diagram illustrating a non-limiting embodiment of a method 300 implementing a DBF communications system according to an exemplary embodiment of the present disclosure is shown. When a new transmission is initiated, the method is first configured to receive 305 a synchronization sequence with distributed coding and a data signal for transmission from the plurality of transmitters to the plurality of receivers employing the exemplary beamforming techniques.

The method next configures the synchronization sequence and the data signal into a plurality of symbols in order to generate 310 a baseband signal. The synchronization sequence may be used at the receivers to acquire timing, magnitude, phase, and frequency offsets for each of the individual transmitters distributed spatially apart from each other. The JSCE may then be used at the individual receivers distributed spatially apart to resolve the unique synchronization and channel errors from each transmitter.

The method next applies 315 a distributed coding matrix to the baseband signal to generate a transmission signal. The distributed coding matrix may be applied to each symbol of the baseband signal by applying a unique row of the distributed coding matrix to symbols of the synchronization sequence. Advantageously, a unitary matrix may be used such that each row and column has a structured magnitude and/or phase adjustment term, resulting in uniform power transfer to certain combinations of symbols in time and space. The allows for all transmitters to be detected at approximately the same SNR. In some exemplary open loop DBF systems, the distributed coding matrix may be applied to the synchronization channel estimation signal and the data signal. In some exemplary closed loop DBF systems, the distribute coding matrix may be applied to the synchronization channel estimation signal.

$$A_{nn} = R^n = \frac{1}{n} \begin{bmatrix} -(n-2) & 2 & 2 & \cdots & 2 \\ 2 & -(n-2) & 2 & \cdots & 2 \\ 2 & 2 & -(n-2) & \cdots & 2 \\ \vdots & \vdots & \vdots & \vdots & \vdots \\ 2 & 2 & 2 & \cdots & -(n-2) \end{bmatrix} \begin{array}{c} \uparrow \\ \text{space} \\ \downarrow \end{array}$$
$$\leftarrow \text{time} \rightarrow$$

Correction weights 320 may then be applied to the signal if correction weights have been received from one or more of a plurality of receivers according to a feed back mechanism. These correction weights may be determined in response to feedback from the receivers, in response to correction weights stored in a memory, or both. The correction weights are used to correct for magnitude, phase, frequency and timing offsets to each transmitted signal such that the plurality of signals received at the receiver array may be constructively combined. Correction weights may be initially equal to 1 and do not change the signal until the weights are updated via feedback from the plurality of receivers if the system uses closed-loop operation.

Each of the weighted signals are then transmitted 325 by each of individual transmitters. Each transmitter then radiates 325 the synchronization signal to the far field. The transmitted signals are next received 335 by each of a plurality of receivers. Each of the plurality of receivers are then operative to apply 340 the distributed coding matrix to each of the received signals. Since the distributed coding matrix is a unity matrix, the same distributed coding matrix applied at to the transmitted signals can be applied to the received signals without inversion.

The receiver is next operative for estimating 345 all frequency, time, magnitude, and phase offsets for each of the received signals. The error correction weights may then transmitted 350 back to the transmitters. The error correction weights may include synchronization, magnitude, and phase correction weights and/or synchronization, magnitude, and phase correction weight averages. In some embodiments, this transmission of the error correction weights may be performed one time as the correction weights for each transmitter are estimated by the receiver system and returned to the respective transmitters so that iterative feedback is not required. The receiver is next operative for correcting 355 for synchronization, frequency, time, magnitude, and/or phase-offsets for each of the signals generated by the individual receivers by applying receiver corrections weights. The method next coherently sums 360 the received signals to extract the data signal.

Figure 4:
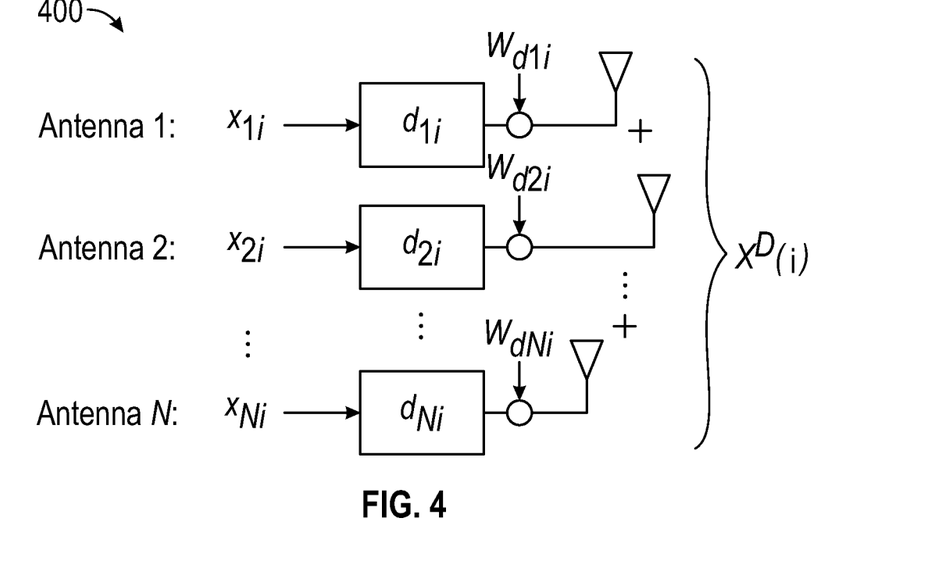
FIG. 4 shows an exemplary system for distributed coding across space and time to symbols or samples of a baseband signal.

Turning now to FIG. 4, an exemplary system 400 for distributed coding across space and time to symbols or samples of a baseband signal is shown. The exemplary system 400 may be a general distributed system using symbol-i, $(x_i)$,. applying it to all distributed transmitters, and the respective distributed coding coefficient $d_{ai}$, is applied to $x_i$ for antenna-a (denoted as $x_{ai}$). Generally, $x_{1i}=x_{2i}=x_{3i}=,\ldots, x_{Ni}=x_i$, with the exception of synchronization timing, frequency, magnitude and phase offsets unique to each transmitter. In general, the distributed coding, $D_{NN}$, and signal transmission, $X_N$, matrices may be defined as:

$$D_{NN} = \delta_N \begin{bmatrix} d_{11} & \cdots & d_{1N} \\ \vdots & \ddots & \vdots \\ d_{N1} & \cdots & d_{NN} \end{bmatrix}$$

and $$X_N = \begin{bmatrix} x_{11} & x_{12} & \cdots & x_{1N} \\ x_{21} & x_{22} & \cdots & x_{2N} \\ \vdots & \vdots & \ddots & \vdots \\ x_{N1} & x_{N2} & \cdots & x_{NN} \end{bmatrix}$$

respectively. Coefficients $\delta_{ai}$ are generally complex-valued and $\delta_N$ is a real-valued constant$\leq 1$. When $\delta_N=1$, and upon initial transmission where $w_{d1i}=w_{d2i}=,\ldots, w_{dNi}=1$, the composite transmitted signal for the $i^{th}$-symbol from all distributed transmitters, including unique synchronization offsets of each distributed transmitter, may be written as:

$$X^D(i) = D_N^T(:,i)[X_N(:,i)] = [d_{1i}\ d_{2i}\ \cdots\ d_{Ni}] \begin{bmatrix} x_{1i} \\ x_{2i} \\ \vdots \\ x_{Ni} \end{bmatrix} = \sum_{a=1}^N x_{ai} d_{ai}$$

The above equation represents the simple form of distributed beamforming using distributed coding without feedback. When closed-loop operation is used, then $w_{d1i}\neq w_{d2i}\neq,\ldots, w_{dNi}$. If only phase adjustments are used, then in general the magnitude of each $|w_{dai}|=1$. If tapering is used across the distributed array, the phase angle of each weight is, $-\pi\leq \angle(w_{dai})\leq \pi$ and $$\sum_{a=1}^N |w_{dai}| = N.$$

This distributed beamforming method may have broad applicability as it may apply to a range of transmitter antenna approaches, from single omni-directional to multi-dimensional arrays. In a DBF sub-array system, a distributed instance of a transmit array, each transmitter can beamform independently, while the distributed coding innovation enables each distributed sub-array to cooperatively form a coherent beam to a desired receiver user equipment (UE).

This general formulation can be applied to any set of transmitters, distributed or collocated. In the collocated case, the distributed coding can be applied to each independent radio frequency (RF) channel, where each RF channel can be either a single antenna element or an antenna array, where in each RF channel could form independent beams via steering vectors and each steering vector has a complex weight that can be used to beamform, along with tapering, in any desired spatial direction of interest.

Figure 5:
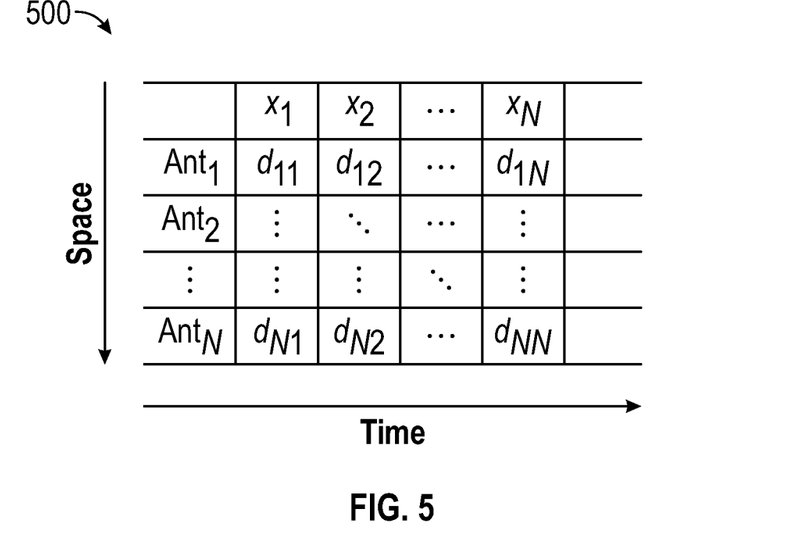
FIG. 5 illustrates a Space-time coding table over N-symbols.

FIG. 5 illustrates a Space-time coding table 500 over N-symbols. The space-time coding table 500 illustrates the application of N-symbols (or samples) in time that are applied to N-distributed transmitters.

Figure 6:
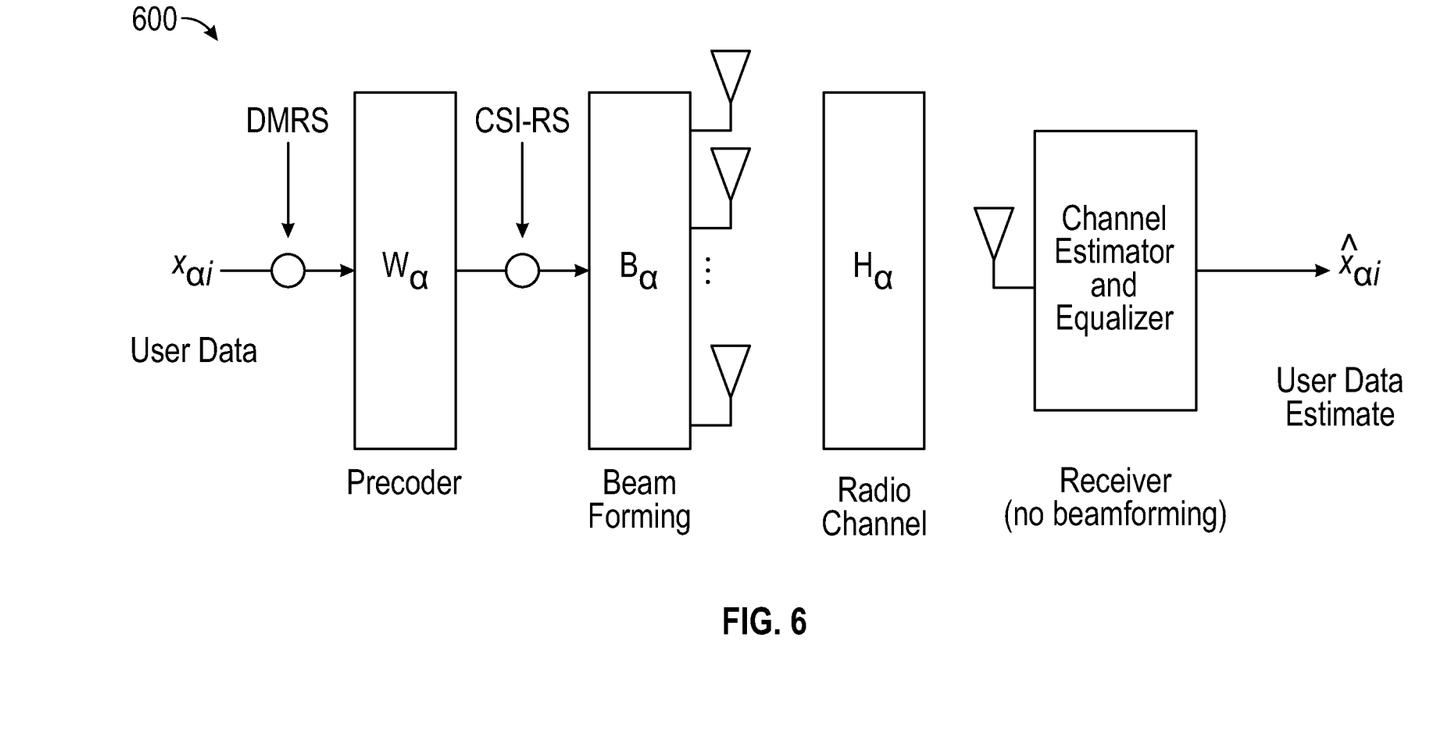
FIG. 6 shows an exemplary distributed base station 600 transmitting to a single antenna desired receiver.

Turning now to FIG. 6, an exemplary distributed base station 600 transmitting to a single antenna desired receiver is shown. For 5G New Radio (NR), a base station (BS) with precoding and beamforming is shown representing the $a^{th}$-distributed transmitter, sending the $i^{th}$-symbol to a UE receiver with no beamforming capability. The 5G NR precoding and beamforming matrices, for this $a^{th}$-distributed transmitter, are represented by $W_a$ and $B_a$, respectively, with the radio channel denoted as $H_a$. Precoding and beamforming for this distributed transmitter follows any standard procedure of using the Demodulation Reference Signal (DMRS) and Channel State Information Reference Signal (CSI-RS) for diversity, channel estimation and beam management/tracking as defined in the 5G NR standard.

Figure 7:
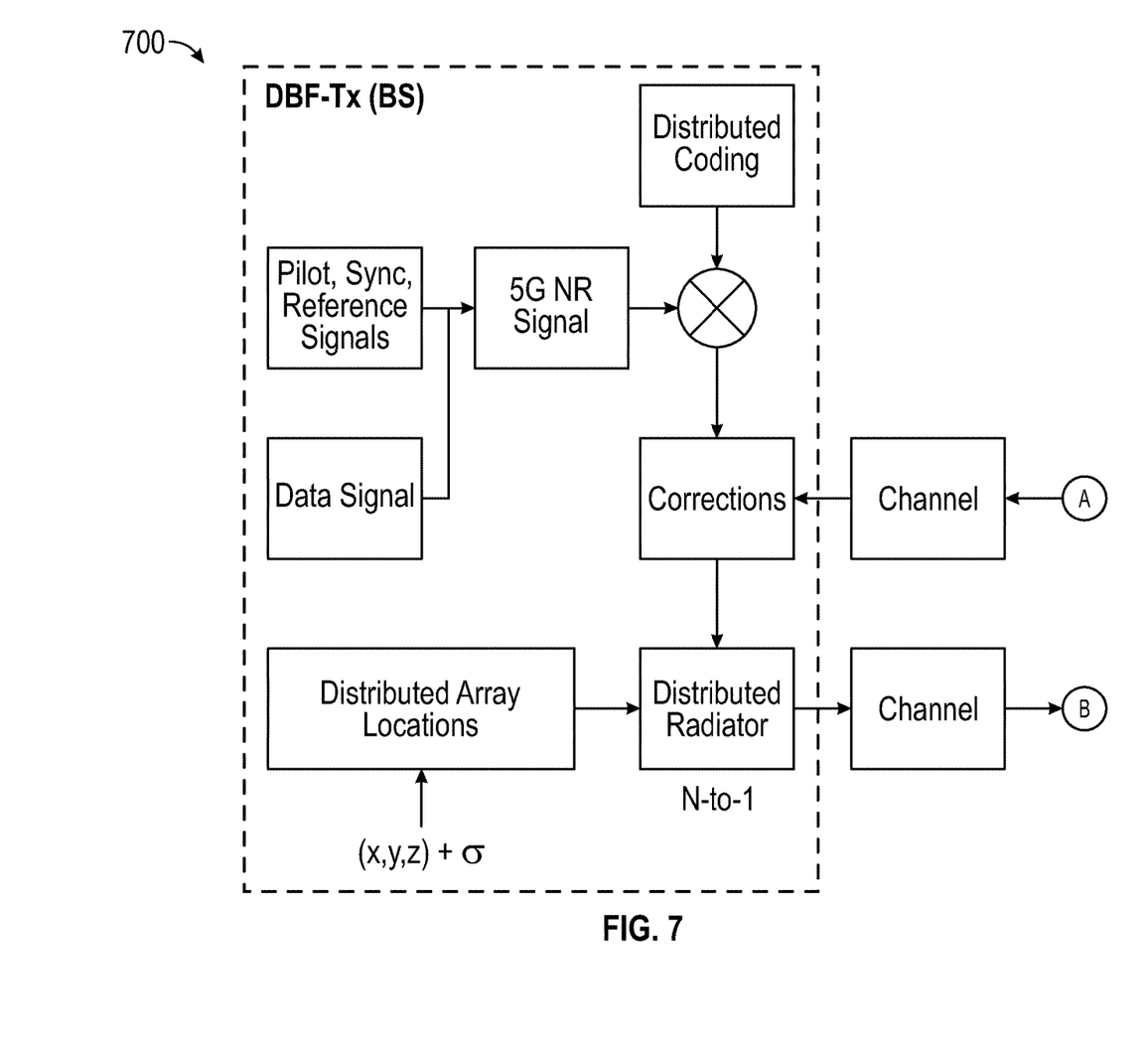
FIG. 7 shows a block diagram of a distributed beamforming-transmit (DBF-Tx) and distributed beamforming-receive (DBF-Rx) system

Turning now to FIG. 7, a block diagram of a distributed beamforming-transmit (DBF-Tx) and distributed beamforming-receive (DBF-Rx) system 700 is shown. The exemplary system 700 illustrates a distributed set of base-stations (BSs) transmitting to user equipment (UEs) using distributed coding/decoding and DBF operation, while M different elements collaborate in the DBF-Rx System. This concept may apply to both open- and closed-loop operation. Achieving distributed coherent operation between each BS and UE radios is challenging because each radio may experience independent timing-, frequency-, and phase-offsets in their on-board oscillators, as well as independent wireless channels. Distributed location effects are addressed in the "Distributed Array" blocks in the DBF-Tx, and -Rx subsystems using built-in physical. (PHY) layer and medium access control (MAC) layer beamforming and beam tracking protocols of 5G NR and combine them with distributed coding and distributed subsystem signal processing. This approach alleviates tight synchronization, channel state information (CSI) accuracy and high overhead feedback messaging between multiple BSs and the UE(s); this is often referred to as coherent joint transmission (C-JT) in LTE or Coordinated Multipoint (CoMP) Transmissions for 5G NR. In addition to minimizing multi-layer CSI overhead and feedback, the DBF capabilities minimize latency tradeoffs for B5G applications.

Figure 8:
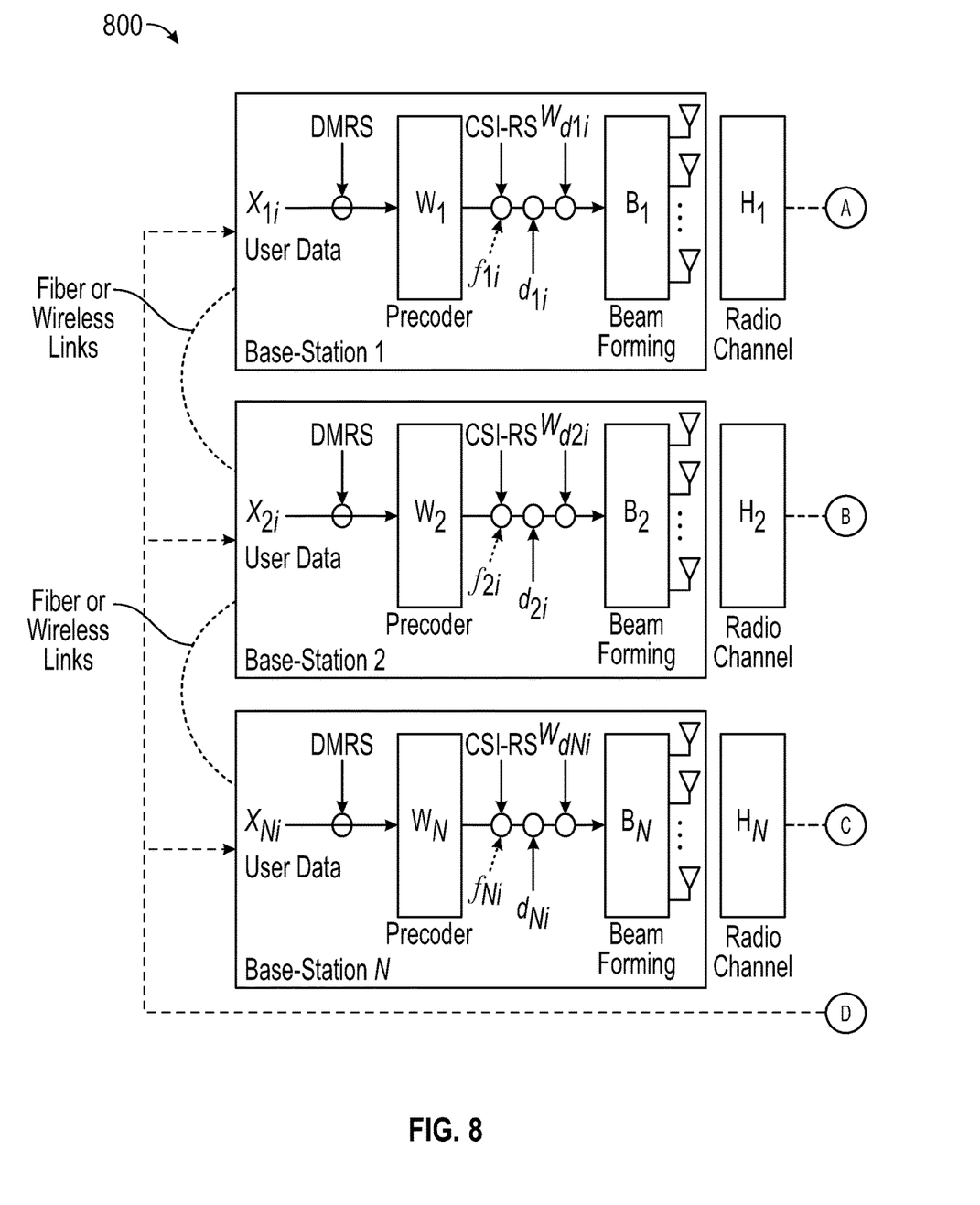
FIG. 8 illustrates a simplified block diagram of an exemplary DBF transmitter.

Turning now to FIG. 8, an exemplary DBF transmitter 800 is shown. The exemplary distributed transmitter 800 generates the far-field transmitted signal, which may be the sum of each of the distributed transmitter signals from each of the distributed transmitters. The distributed collector may be an array sensor. For a single antenna UE, this is a single array receive element; for a multi-element receiver, the distributed collector outputs a unique signal for each element in the receive array. For the single-antenna UE case, the $i^{th}$-symbol received signal can be written as:

$$y_{di} = H_i x_{di}$$

where $H_i$ is the complex channel coefficient(s) between composite distributed transmit signal, $x_{di}$, and the receiver, excluding synchronization offsets and channels between each distributed transmitter and the receiver. Applying distributed decoding to $y_{di}$, the resulting signal can be written as $$f_{ai} = D_{NN}^{-1}(:,i) y_{di} = D_{NN}^{-i}(:,i) H h_{dai} x_{di}$$

where $D_{NN}^{-1}(:,i)$ is the $i^{th}$-column of the inverse of the distributed coding matrix, $D_{NN}$, and $h_{dai}$ is a variable representing the synchronization offsets and channel from each distributed transmitter to the receiver.

A benefit of distributed coding is that decoupling of the individual transmit signals can be done robustly. For scalability, the coding approach should be applicable to any number of collaborating devices (N for the DBF-Tx and M for the DBF-Rx systems). One characteristic of the distributed coding is that the coding may be applied over N symbol (or sample) transmissions. Statistically, we want the output of the coding technique to produce an average power over N symbol (or sample) transmissions that is the same regardless of random carrier phase of the individual DBF-Tx elements and their coherent sum in the far-field of the radiated signal at the receiving location. By employing this strategy, all decoupled signals at the output of the decoding process at each receiver element experience approximately the same SNR improvement. The coefficient values of the distributed coding matrix $D_{NN}$ help ensure the balanced SNR distributions thereby ensuring scalability in the number of distributed transmitters.

If a feedback channel is available, correction weights computed by the DBF-Rx are relayed back to the DBF-Tx. For 5G NR applications, the Demodulation Reference Signal (DMRS), Channel State Information Reference Signal (CSI-RS) and Sounding Reference Signal (SRS) can be used for non-distributed beam acquisition and tracking and combined with distributed coding/decoding as a layered approach. Thus, all beam-acquisition and -management functions within 5G NR work in an integrated fashion with the proposed DBF approach. A UE can acquire and optimize received beams with respect to each individual BS, while the DBF method enables a layered gNB cooperative improvement beyond that of what a single gNB and UE provide.

Figure 9:
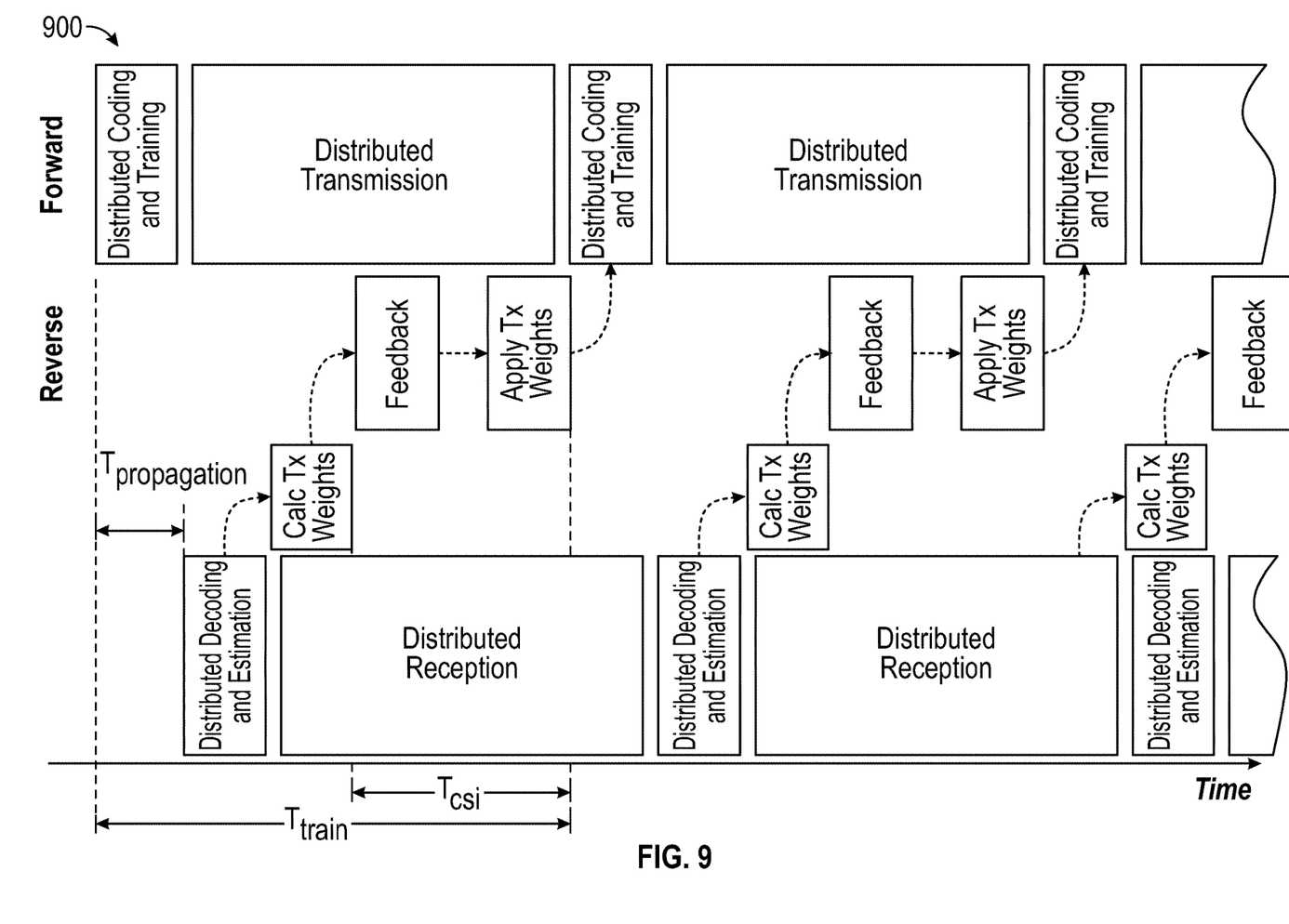
FIG. 9 is an illustrative block diagram for a system for applying the DBF approach as shown in FIG. 7 to the 5G NR BS shown in FIG. 6.

FIG. 9 is an illustrative block diagram for a system 800 for applying the DBF approach as shown in FIG. 7 to the 5G NR BS shown in FIG. 6. In this exemplary embodiment, there may be either a fiber link (as in CoMP systems) or a wireless link between distributed BSs. If a tactical cell on wheels (COW) is used, wireless links may be used for ease of deployment. The information shared between BSs is the information signal to be transmitted and periodic synchronization updates/array calibration signals. Synchronization updates/calibration signals may be taken care of by correction weights via the feedback channel. The distributed coding may be applied between the precoding and beamforming functions (either of which may optionally be applied), as well as the DBF correction weights (initially $w_{d1i} = w_{d2i} = \ldots, w_{dNi} = 1$ until feedback information is applied). Note that with the distributed decoding at the receiver, each distributed transmitter signal is processed separately. Therefore, original functionality of 5G NR may be preserved, while enabling further SNR enhancements via distributed estimation processing for coherent DBF BS signal combining at the UE, which achieves N-factor SNR improvement for open-loop operation and $N^2$-factor SNR improvement for closed-loop operation. If M-multiple receiver elements are available, then those improvements are further improved by a factor of M.

For closed-loop operation, the correction weights may include any residual synchronization- and channel-corrections necessary to maximize the global SNR across all DBF-Rx elements. If no correction weights are fed back, this is considered open-loop operation. For closed-loop operation, the correction weights are fed back in a single-step, that enables the system to operate in mobile conditions. For closed-loop operation, the SNR is maximized by coherently aligning the individual DBF-Tx signals in the far-field radiated signal. The maximum SNR gain for the closed-loop DBF-Tx and DBF-Rx (N,M) system is $N^2M$ with 1-step feedback. If no feedback channel is available, the maximum DBF-Rx SNR gain is limited to NM. FIG. 9 an exemplary information flow 900 illustrates the forward and reverse information flow between the DBF BS transmitters and the UE receiver.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

What is claimed is:

1. A method for transmitting a data signal employing a digital beamforming technique comprising:

generating, by a first transmitter, a first symbol in response to the data signal and a first synchronization sequence;

generating, by the first transmitter, a first transmission signal by applying a distributed coding matrix to the first symbol;

generating, by a second transmitter, a second symbol in response to the data signal and a second synchronization sequence;

generating, by the second transmitter, a second transmission signal by applying the distributed coding matrix to the second symbol;

receiving, by a first receiver, the first transmission signal and the second transmission signal, isolating, by the first receiver, the first transmission signal in response to applying the distributed coding matrix to the first transmission signal;

extracting, by the first receiver, the first symbol from the first transmission signal in response to the first synchronization sequence;

receiving, by a second receiver, the first transmission signal and the second transmission signal;

isolating, by the second receiver, the first transmission signal in response to applying the distributed coding matrix to the second transmission signal;

extracting, by the second receiver, the second symbol in response to the second synchronization sequence; and estimating, by a processor, the data signal in response to the first symbol and the second symbol.

2. The method of claim 1, wherein the distributed coding matrix is a unitary distributed coding matrix wherein each row and column of the unitary distributed coding matrix includes a magnitude and/or phase adjustment term.

3. The method of claim 1, wherein the first synchronization sequence and the second synchronization sequence form a portion of a joint synchronization-channel estimation scheme.

4. The method of claim 1, further comprising:

determining, by the first receiver, a first correction weight in response to at least one of a first timing offset, a first magnitude offset, a first phase offset and a first frequency offset in response to the first transmission signal;

determining, by the second receiver, a second correction weight in response to at least one of a second timing offset, a second magnitude offset, a second phase offset and a second frequency offset in response to the second transmission signal;

generating an average correction weight in response to the first correction weight and the second correction weight; and transmitting the average correction weight to the first transmitter and the second transmitter.

5. The method of claim 4, wherein a subsequent first transmission signal is generated in response to the average correction weight and a subsequent second transmission signal is generated in response to the average correction weight.

6. The method of claim 1, wherein the first transmission signal and the second transmission signal are orthogonal frequency division multiplexing modulated signals.

7. The method of claim 1, wherein each row and column of the distributed coding matrix includes a structured magnitude and/or phase term adjustment.

8. A beamforming communications system comprising:

a first transmitter configured for generating a first symbol in response to the data signal and a first training sequence and for generating a first transmission signal by applying a distributed coding matrix to the first symbol;

a second transmitter configured for generating a second symbol in response to the data signal and a second training sequence and for generating a second transmission signal by applying the distributed coding matrix to the second symbol;

a first receiver configured for receiving the first transmission signal and the second transmission signal, for isolating the first transmission signal in response to the distributed coding matrix, and for extracting the first symbol from the first transmission signal in response to applying the first training sequence to the first transmission signal;

a second receiver configured for receiving the first transmission signal and the second transmission signal, isolating the second transmission signal in response to the distributed coding matrix and extracting the second symbol in response to applying the second training sequence to the first transmission signal; and a processor configured for estimating the data signal in response to the first symbol and the second symbol.

9. The beamforming communications system of claim 8, wherein the distributed coding matrix is a unitary distributed coding matrix wherein each row and column of the unitary distributed coding matrix includes a structured magnitude and/or phase adjustment term.

10. The beamforming communications system of claim 8, wherein at least one of the first training sequence and the second training sequence is a pilot signal for estimating a synchronization offset and a channel offset.

11. The beamforming communications system of claim 8, wherein the first receiver is further configured for determining a first correction weight in response to at least one of a first timing offset, a first magnitude, a first phase offset and a first frequency offset in response to the first transmission signal and the second receiver is further configured for determining a second correction weight in response to at least one of a second timing offset, a second magnitude, a second phase offset and a second frequency offset in response to the second transmission signal and wherein a feedback processor is configured to generate an average correction weight in response to the first correction weight and the second correction weight and to transmit the average correction weight to the first transmitter and the second transmitter.

12. The beamforming communications system of claim 11, wherein the first transmitter is further configured to generate a subsequent first transmission signal in response to the average correction weight and the second transmitter is further configured to generate a subsequent second transmission signal in response to the average correction weight.

13. The beamforming communications system of claim 8, wherein the first transmission signal and the second transmission signal are orthogonal frequency division multiplexing modulated signals.

14. The beamforming communications system of claim 8, wherein each row and column of the distributed coding matrix includes a structured magnitude and/or phase term adjustment.

15. A method of transmitting a data signal comprising:
receiving a data signal;
generating a first sample in response to the data signal and a distributed coding matrix;
generating a second sample in response to the data signal and the distributed coding matrix ;
generating a first transmission signal in response to applying a first synchronization sequence to the first sample;
generating a second transmission signal in response to applying a second synchronization sequence to the second sample;
transmitting the first transmission signal by a first transmitter;
transmitting the second transmission signal by a second transmitter;
receiving the first transmission signal and the second transmission signal;
isolating the first transmission signal in response to the first synchronization sequence;
isolating the second transmission signal in response to the second synchronization sequence;
extracting the first sample by applying the distributed coding matrix to the first transmission signal;
extracting the second sample by applying the distributed coding matrix to the second transmission signal; and
estimating the data signal in response to the first sample and the second sample.

16. The method of claim 15, wherein the distributed coding matrix is a unitary distributed coding matrix wherein each row and column of the unitary distributed coding matrix includes structured magnitude and/or phase adjustment terms.

17. The method of claim 15, wherein the first synchronization sequence and the second synchronization sequence form a portion of a joint synchronization-channel estimation scheme.

18. The method of claim 15, further comprising:
determining, by the first receiver, a first correction weight in response to at least one of a first timing offset, a first magnitude, a first phase offset and a first frequency offset in response to the first transmission signal;
determining, by the second receiver, a second correction weight in response to at least one of a second timing offset, a second magnitude, a second phase offset and a second frequency offset in response to the second transmission signal;
generating an average correction weight in response to the first correction weight and the second correction weight; and
transmitting the average correction weight to the first transmitter and the second transmitter.

19. The method of claim 18, wherein a subsequent first transmission signal is generated in response to the average correction weight and a subsequent second transmission signal is generated in response to the average correction weight.

20. The method of claim 19, wherein the first transmission signal and the second transmission signal are orthogonal frequency division multiplexing modulated signals.

* * * * *